United States Patent Office
3,813,430
Patented May 28, 1974

3,813,430
1-ARYL-2-ALKYL OR -ALKENYL-3,4-DIHYDRO-NAPHTHALENES
Donald K. Phillips, East Greenbush, N.Y., assignor to Sterling Drug Inc., New York, N.Y.
No Drawing. Filed Oct. 26, 1970, Ser. No. 84,135
Int. Cl. C07c 39/12, 43/20, 69/14
U.S. Cl. 260—479 R                16 Claims

ABSTRACT OF THE DISCLOSURE

Certain 1-aryl-2-alkyl or -alkenyl-3,4-dihydronaphthalenes, having hypocholesteremic and antiseptic action, are prepared via Grignard or allied reactions on the corresponding 1-tetralones.

---

This invention relates to 1-aryl-2-alkyl or -alkenyl-3,4-dihydronaphthalenes and in particular is concerned with compounds of the formula

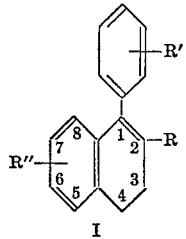

I wherein R is alkyl or alkenyl of from one to ten carbon atoms; R' is a member of the group consisting of hydrogen, lower-alkyl, hydroxy, lower-alkanoyloxy, hydroxy-lower-alkoxy, dihydroxy-lower-alkoxy and

—O—Y—N=B, wherein Y is lower-alkylene of 2–5 carbon atoms and N=B is di-lower-alkylamino, pyrrolidino, piperidino or morpholino; and R'' is a member of the group consisting of hydroxy, lower-alkoxy, lower-alkanoyloxy, hydroxy-lower-alkoxy, dihydroxy-lower-alkoxy and

—O—Y—N=B.

The groups R' and R'' in the above formula I can be in any of the possible positions of the respective benzene rings.

In the compounds of formula I above, the alkyl or alkenyl groups R have from one to ten carbon atoms and may be straight or branched, thus including such groups as methyl, ethyl, propyl, isopropyl, tertiary-butyl, hexyl, octyl, decyl, 6-methylnonyl, vinyl, allyl, 3-butenyl, 4-hexenyl, 3-decenyl, and the like.

In the compounds of formula I above, where R' and/or R'' stand for lower-alkyl, lower alkoxy, hydroxy-lower-alkoxy, dihydroxy-lower-alkoxy or —O—Y—N=B where N=B is di-lower-alkylamino, the lower-alkyl moiety has from one to about six carbon atoms which can be straight or branched.

In the compounds of formula I above, where R' and/or R'' stand for lower-alkanoyloxy, lower-alkanoyl has from one to about six carbon atoms, thus including such groups as formyl, acetyl, propionyl, valeryl, isovaleryl, butyryl, isobutyryl, caproyl and the like.

In the compounds of formula I above, where R' and/or R'' stand for hydroxy-lower-alkoxy or dihydroxy-lower-alkoxy, the hydroxy groups are preferably not attached to the carbon atom adjacent to the ether oxygen, and, in the case of the dihydroxy-lower-alkoxy groups, the two hydroxy groups are preferably attached to different carbon atoms.

In the compounds of formula I above, wherein R' and/or R'' stand for —O—Y—N=B, the alkylene bridge Y has 2–5 carbon atoms and may be straight or branched, thus including such divalent radicals as —CH$_2$CH$_2$—, —CH$_2$CH$_2$CH$_2$—, —CH$_2$CH(CH$_3$)CH$_2$—,

—CH$_2$C(CH$_3$)$_2$CH$_2$—,

—CH$_2$CH$_2$CH$_2$CH$_2$—, —CH$_2$CH$_2$CH$_2$CH$_2$CH$_2$—, and the like.

The compounds of formula I are prepared by interacting a compound of the formula

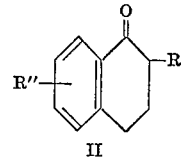

II with a Grignard reagent R'—C$_6$H$_4$MgX, X being halogen, preferably chlorine, bromine or iodine, and then hydrolyzing the reaction mixture. The resulting tertiary carbinol of the formula

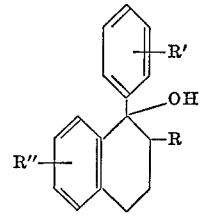

is not isolated but is dehydrated to a compound of formula I either during the work-up of the Grignard reaction or by heating in an inert solvent with a trace of a strong acid.

In the foregoing Grignard reaction it is preferred that R' be hydrogen, lower-alkyl or lower-alkoxy and R'' lower-alkoxy because of the ready availability of starting materials, although the compounds where R' is hydroxy are also readily prepared using a Grignard reagent derived from the 2'-tetrahydropyranyl ether or a hydroxyphenyl halide. After the Grignard reaction, the 2'-tetrahydropyranyl ether is cleaved with strong acid.

The compounds of formula I where R' and/or R'' are lower-alkoxy are readily converted to other compounds of formula I by conventional methods. The lower-alkoxy groups are readily cleaved to hydroxy groups by heating with pyridine hydrochloride or boron tribromide. The hydroxy groups in turn can be esterified with an acid anhydride or acid halide to form lower-alkanoyloxy groups, or etherified with the appropriate substituted alkyl halide to form lower-alkoxy, hydroxy-lower-alkoxy, dihydroxy-lower-alkoxy, or amino-lower-alkoxy groups. If desired, similar transformations can be carried out with the group R'' in the tetralone intermediate II prior to the Grignard reaction.

The intermediate tetralones of formula II are prepared by alkylation of the corresponding R''-1-tetralones. An R''-1-tetralone, R'' preferably being lower-alkoxy, is heated with cyclohexylamine to give the corresponding 1-cyclohexylimino compound, which with ethylmagnesium bromide is converted to the N-magnesium bromide salt. The latter when treated with an alkyl or alkenyl halide, RX, affords the desired tetralone of formula II.

The compounds of the invention of formula I where R' and/or R'' are —O—Y—N=B are basic in nature and readily form acid-addition salts. It will be appreciated that formula I not only represents the structural configuration of the free bases but is also representative of the respective structural entity which is common to all of the respective compounds of formula I whether in the form of the free bases or in the form of the acid-addition salts of the bases. By virtue of this common structural entity, the bases and their salts have inherent biological activity of a type to be more fully described hereinbelow. When used for pharmaceutical purposes one can employ the free bases themselves or the acid-addition salts formed from pharmaceutically-acceptable acids, that is, acids whose anions are innocuous to the animal organism in effective doses of the salts so that beneficial properties inherent in the common structural entity represented by the free bases are not vitiated by side-effects ascribable to the anions.

In utilizing the pharamacodynamic activity of the salts of the invention, pharmaceutically-acceptable salts are preferred. Although water-insolubility, high toxicity, or lack of crystalline character may make some particular salt species unsuitable or less desirable for use as such in a given pharmaceutical application, the water-insoluble or toxic salts can be converted to any desired pharmaceutically-acceptable salt by double decomposition reactions involving the anion, for example, by ion-exchange procedures. Moreover, apart from their usefulness in pharmaceutical applications, the salts are useful as characterizing or identifying derivatives of the free bases or in isolation or purification procedures.

It will be appreciated from the foregoing that all of the acid-addition salts of the new bases of the invention are useful and valuable compounds, regardless of considerations of solubility, toxicity, physical form, and the like, and are accordingly within the purview of the instant invention.

The novel feature of the compounds of the invention, then, resides in the concept of the bases and cationic forms of the basic compounds of formula I and not in any particular acid moiety or acid anion associated with the salt forms of the compounds; rather, the acid moieties or anions which can be associated in the salt forms are in themselves neither novel nor critical and therefore can be any acid anion or acid-like substance capable of salt formation with bases. In fact, in aqueous solutions, the base form or water-soluble acid-addition salt form of the compounds of the invention both possess a common protonated cation or ammonium ion.

Thus the acid-addition salts discussed above and claimed herein are prepared from any organic acid, inorganic acid (including organic acids having an inorganic group therein), or organometallic acid as exemplified by organic mono- and polycarboxylic acids. Illustrative acid-addition salts are those derived from such diverse acids as formic acid, acetic acid, isobutyric acid, alpha-mercaptopropionic acid, malic acid, fumaric acid, succinic acid, succinamic acid, tartaric acid, citric acid, lactic acid, benzoic acid, 4-methoxybenzoic acid, phthalic acid, anthranilic acid, 1-naphthalenecarboxylic acid, cinnamic acid, cyclohexanecarboxylic acid, cyclohexanesulfamic acid, mandelic acid, tropic acid, crotonic acid, acetylene dicarboxylic acid, sorbic acid, 2-furancarboxylic acid, cholic acid, pyrenecarboxylic acid, 2-pyridinecarboxylic acid, 3-indoleacetic acid, quinic acid, sulfamic acid, methanesulfonic acid, isethionic acid, benzenesulfonic acid, p-toluenesulfonic acid, benzenesulfinic acid, butylarsonic acid, diethylphosphinic acid, p-aminophenylarsinic acid, phenylstibnic acid, phenylphosphinous acid, methylphosphinic acid, phenylphosphinic acid, hydrofluoric acid, hydrochloric acid, hydrobromic acid, hydriodic acid, perchloric acid, nitric acid, sulfuric acid, phosphoric acid, hydrocyanic acid, phosphotungstic acid, molybdic acid, phosphomolybdic acid, pyrophosphoric acid, arsenic acid, picric acid, picrolonic acid, barbituric acid, boron trifluoride, and the like.

The acid-addition salts are prepared either by dissolving the free base in an aqueous solution containing the appropriate acid and isolating the salt by evaporating the solution, or by reacting the free base and acid in an organic solvent, in which case the salt separates directly or can be obtained by concentration of the solution.

Biological evaluation of the compounds of formula I by standard test procedures has shown that they possess hypocholesteremic activity and are therefore useful in the treatment or prevention of atherosclerotic conditions in mammals. The compounds were administered by stomach tube to male rats and the serum blood cholesterol levels measured by the method of Turner and Eales [Scand. J. Clin. Lab. Investigation 9, 210 (1959)]. The compounds of the invention were generally found to be effective in dose levels ranging from 25 to 150 mg./kg., although certain species, for example, 2-hexyl-1-(p-acetoxyphenyl)-3, 4-dihydro - 6 - methoxynaphthalene, are effective at dose levels as low as 5 mg./kg.

Biological evaluation of the compounds of formula I by standard serial dilution procedures has shown that they also possess bacteriostatic and fungistatic activity, and are therefore useful as antiseptic agents. They have been found to be effective in vitro against such organisms as *Staphylocoocus aureus* and *Trichophyton mentagrophytes* at concentrations of 2.5–50 µg./ml.

The actual determination of the numerical biological data definitive for a particular compound is readily obtained by standard test procedures by technicians trained in pharmacological test procedures, without the need for any extensive experimentation. They are prepared for use by conventional pharmaceutical formulation procedures, that is, in capsule or tablet form with conventional excipients (for example, calcium carbonate, starch, lactose, talc, magnesium sterarate, gum acacia, and the like) for oral administration; or as an aqueous or oil suspension in a pharmaceutically acceptable vehicle (aqueous alcohol, glycol, oil solution, or oil-water emulsion) for parenteral administration. The compounds in suitable media can also be applied topically to organic or inorganic surfaces for disinfectant purposes.

The structures of the compounds of the invention were established by the modes of synthesis, by elementary analysis, and by infrared, ultraviolet and nuclear magnetic resonance spectral determinations.

The following examples will further illustrate the invention.

PREPARATION 1

(a) 1-cyclohexylimino - 6 - methoxy - 1,2,3,4 - tetrahydronaphthalene.—A mixture of 352.5 g. of 6-methoxy-α-tetralone, 300 g. of cyclohexylamine, 225 ml. of toluene and 10 drops of glacial acetic acid was heated at reflux under a water separator for 24 hours. An additional 50 g. of cyclohexylamine was added and the mixture heated for an additional 72 hours under the water separator. The mixture was concentrated to remove the solvent and the residue containing 1-cyclohexylimino-6-methoxy-1,2,3,4-tetrahydronaphthalene was used without further purification in part (b) below.

By replacing the 6-methoxy-α-tetralone in the foregoing preparation by a molar equivalent amount of 5-methoxy-α-tetralone, 7-methoxy-α-tetralone, 8-methoxy-α-tetralone or 6-(n-butoxy)-α-tetralone, there can be obtained, respectively, 1-cyclohexylimino-5-methoxy-1,2,3,4-tetrahydronaphthalene,
1-cyclohexylimino-7-methoxy-1,2,3,4-tetrahydronaphthalene,
1-cyclohexylimino-8-methoxy-1,2,3,4-tetrahydronaphthalene,
1-cyclohexylimino-6-(n-butoxy)-1,2,3,4-tetrahydronaphthalene.

(b) 2 - allyl - 3,4-dihydro-6-methoxy-1(2H)-naphthalenone [II; R is $CH_2CH=CH_2$, R'' is 6-$CH_3O$].—A solution of ethylmagnesium bromide (400 ml. 3 $N$ in ether) was concentrated to remove most of the ether, and the ether replaced by 400 ml. of tetrahydrofuran. A solution of 257 g. of the 1-cyclohexylimino-6-methoxy-1,2,3,4-tetrahydronaphthalene from part (a) in 800 ml. of tetrahydrofuran was added in a fine stream to the Grignard reagent held at reflux. The mixture was stirred at reflux for 21 hours, then cooled, and 145.2 g. of allyl bromide in 200 ml. of tetrahydroflran was added dropwise at a rate such that gentle reflux was maintained. The resulting mixture was stirred at reflux for 22 hours, then concentrated to half its volume and filtered to remove gummy solid. Ether (3.5 liters) was added to the filtrate which was again filtered and concentrated to a residual oil (227 g.). The latter was partitioned between ether and dilute hydrochloric acid, and the ether layers dried over anhydrous sodium sulfate. The aqueous layers were stirred at reflux for four hours, cooled and extracted with ether. The ether extracts were dried, combined with the ether solution obtained previously, concentrated, and distilled to give 150 g. of 2-allyl-3,4-dihydro-6-methoxy-1(2H)-naphthalenone, pale yellow oil, B.P. 145–147° C. (0.1 mm.), $n_D^{25}=1.5687$.

By replacing the allyl bromide in the foregoing preparation by a molar equivalent amount of isopropyl bromide, 4-hexenyl bromide or 3-decenyl bromide, there can be obtained, respectively, 2-isopropyl-3,4-dihydro-6-methoxy-1(2H)-naphthalenone [II; R is $CH(CH_3)_2$, R″ is 6 - $CH_3O$]; 4 - hexenyl-3,4-dihydro-6-methoxy-1(2H)-naphthalenone [II; R is $CH_2CH_2CH_2CH=CHCH_3$, R″ is 6-$CH_3O$]; or 3 - decenyl - 3,4-dihydro-6-methoxy-1(2H)-naphthalenone [II; R is $CH_2CH_2CH=CH(CH_2)_5CH_3$, R″ is 6-$CH_3O$].

By replacing the 1-cyclohexylimino-6-methoxy-1,2,3,4-tetrahydronaphthalene in the foregoing preparation by a molar equivalent amount of 1 - cyclohexylimino - 5-methoxy - 1,2,3,4 - tetrahydronaphthalene, 1 - cyclohexylimino - 7 - methoxy - 1,2,3,4-tetrahydronaphthalene, 1-cyclohexylimino - 8 - methoxy - 1,2,3,4-tetrahydronaphthalene, or 1 - cyclohexylimino - 6 - (n-butoxy)-1,2,3,4-tetrahydronaphthalene, there can be obtained, respectively, 2 - allyl - 3,4-dihydro-5-methoxy-1(2H)-naphthalenone [II; R is $CH_2CH=CH_2$, R″ is 7-$CH_3O$]; 2-allyl-3,4 - dihydro - 8-methoxy-1(2H)-naphthalenone [II; R is $CH_2CH=CH_2$, R″ is 8-$CH_3O$]; or 2-allyl-3,4-dihydro-6-(n-butoxy)-1(2H)-naphthalenone [II; R is $CH_2CH=CH_2$, R″ is 6-$CH_3CH_2CH_2CH_2O$].

PREPARATION 2

2 - (n - butyl)-3,4-dihydro-6-methoxy-1(2H)-naphthalenone [II; R is $CH_2CH_2CH_2CH_3$, R″ is 6-$CH_3O$] was prepared according to the procedure of Preparation 1 but replacing the allyl bromide with 164.4 g. of n-butyl bromide, and was obtained in the form of a pale yellow oil, B.P. 154–156° C. (0.3 mm.), $n_D^{25}=1.5480$.

PREPARATION 3

2 - methyl - 3,4 - dihydro-6-methoxy-1(2H)-naphthalenone [II; R is $CH_3$, R″ is 6-$CH_3O$] was prepared according to the procedure of Preparation 1 but replacing the allyl bromide with 151.4 g. of dimethyl sulfate, and was obtained in the form of a pale yellow oil, 158 g., B.P. 126–128° C. (0.05 mm.), $n_D^{25}=1.5685$.

PREPARATION 4

2 - (n - hexyl) - 3,4-dihydro-6-methoxy-1(2H)-naphthalenone [II; R is $(CH_2)_5CH_3$, R″ is 6-$CH_3O$] was prepared according to the procedure of Preparation 1 but replacing the allyl bromide with 233 g. of n-hexyl iodide, and was obtained in the form of a low-melting solid, 162 g., M.P. 35–36.5° C. when recrystallized from methanol.

PREPARATION 5

2 - (n - decyl) - 3,4-dihydro-6-methoxy-1(2H)-naphthalenone [II; R is $(CH_2)CH_3$, R″ is 6-$CH_3O$] was prepared according to the procedure of Preparation 1 but replacing the allyl bromide with 221.2 g. of n-decyl bromide; also 100 mg. of potassium iodide was added prior to the addition of the n-decyl bromide. The product was obtained in the form of a pale yellow solid, 244 g., M.P. 61–62° C. when recrystallized from methanol.

2 - (n - butyl) - 3,4 - dihydro-6-methoxy-1(2H)-naphthalenone can be demethylated by heating it with pyridine hydrochloride to give 2-(n-butyl)-3,4-dihydro-6-hydroxy-1(2H)-naphthalenone [II; R is $CH_2CH_2CH_2CH_3$, R″ is 6-HO]. The latter can be acylated with acetic anhydride in the presence of catalytic amounts of sulfuric acid to give 2 - (n - butyl)-3,4-dihydro-6-acetoxy-1(2H)-naphthalenone [II; R is $CH_2CH_2CH_2CH_3$, R″ is 6-$CH_3COO$]; or with capropyl chloride to give 2-(n-butyl)-3,4-dihydro-6-caproyloxy-1(2H)-naphthalenone [II; R is $$CH_2CH_2CH_2CH_3$$

R″ is 6-$CH_3(CH_2)_4COO$].

2 - (n - butyl) - 3,4-dihydro-6-hydroxy-1(2H)-naphthalenone can also be caused to react with 2-dimethylaminoethyl chloride, 4-dimethylaminobutyl chloride, 2-(1 - pyrrolidyl)ethyl chloride, 2-(1-piperidyl)ethyl chloride, or 2-(4-morpholinyl)ethyl chloride in the presence of sodium methoxide, to give, respectively, 2-(n-butyl)-3,4-dihydro-6-(2-dimethylaminoethoxy)-1(2H)-naphthalenone [II; R is $CH_2CH_2CH_2CH_3$, R″ is 6-$(CH_3)_2NCH_2CH_2O$];

2-(n-butyl)-3,4-dihydro-6-(4-dimethylaminobutoxy)-1(2H)-naphthalenone [II; R is $CH_2CH_2CH_2CH_3$, R″ is 6-$(CH_3)_2NCH_2CH_2CH_2CH_2O$];

2-(n-butyl)-3,4-dihydro-6-[2-(1-pyrrolidyl)ethoxy]-1(2H)-naphthalenone [II; R is $CH_2CH_2CH_2CH_3$, R″ is 6-$(CH_2)_4$-$NCH_2CH_2O$];

2-(n-butyl)-3,4-dihydro-6-[2-(1-piperidyl)ethoxy]-1(2H)-naphthalenone [II; R is $CH_2CH_2CH_2CH_3$, R″ is 6-$(CH_2)_5NCH_2CH_2O$]; or 2-(n-butyl)-3,4-dihydro-6-[2-(4-morpholinyl)ethoxy]-1(2H)-naphthalenone [II; R is $CH_2CH_2CH_2CH_3$, R″ is 6-$O(CH_2)_4NCH_2CH_2O$].

EXAMPLE 1

2 - allyl - 1-(p-hydroxyphenyl)-3,4-dihydro-6-methoxynaphthalene [I; R is $CH_2CH=CH_2$, R′ is 4-OH, R″ is 6 $CH_3O$].—To the Grignard reagent prepared from 95 g. of 4-bromophenyl 2′-tetrahydropyranyl ether and 11 g. of magnesium turnings in 500 ml. of tetrahydrofuran was added a solution of 65 g. of 2-allyl-3,4-dihydro-6-methoxy-1(2H)-naphthalenone (Preparation 1b) in 200 ml. of tetrahydrofuran. The reaction mixture was stirred at reflux for 23 hours. The solvent was then distilled off, the residue diluted with ether and shaken with aqueous ammonium chloride to hydrolyze the Grignard complex. The ether layer was separated, dried over anhydrous sodium sulfate and concentrated. The residue was redissolved in ether, extracted with 5% aqueous sodium hydroxide, washed with water, dried over anhydrous sodium sulfate and again concentrated. The residual oil (123 g.) in 400 ml. of methanol and 100 ml. of 3 N-hydrochloric acid was stirred at reflux for 90 minutes. The residue was dissolved in ether, washed with aqueous sodium hydroxide solution, dried over sodium sulfate, and concentrated to give 51 g. of 2-allyl-1-(p-hydroxyphenyl)-3,4-dihydro-6-methoxynaphthalene as a red-brown oil. Acidification and extraction of the alkaline extracts afforded an additional 26 g. of product.

EXAMPLE 2

2-allyl-1-[p-(2-diethylaminoethoxy)phenyl]-3,4 - dihydro-6-methoxynaphthalene [I; R is $CH_2CH=CH_2$, R′ is 4-$OCH_2CH_2N(C_2H_5)_2$, R″ is 6-$CH_3O$].—A mixture of 14.5 g. of 2-allyl-1-(p-hydroxyphenyl)-3,4-dihydro-6-methoxynaphthalene (Example 1), 3.8 g. of sodium methoxide, 200 ml. of chlorobenzene and 25 ml. of methanol was stirred and distilled until the head temperature reached 130° C. The mixture was cooled, 12.2 g. of 2-diethylaminoethyl chloride added, and the mixture stirred at reflux for 3.5 hours. The solution was concentrated to remove the solvent, the residue dissolved in ether and the ether solution extracted with dilute hydrochloric acid. The aqueous acid solution was made basic with sodium hydroxide, and the alkaline mixture extracted with ether. The ether extracts were dried over anhydrous sodium sulfate and concentrated to give 20 g. of 2-allyl-1-[p-(2-diethylaminoethoxy)phenyl]-3,4-dihydro-6-methoxynaphthalene as a red-brown oil. The latter was dissolved in ether and treated with ethereal hydrogen chloride to yield a gum. The gum was dissolved in benzene and the solution diluted with ether whereupon there crystallized 21 g. of 2-allyl-1-[p-(2-diethylaminoethoxy)phenyl]-3,4-dihydro-6-methoxynaphthalene in the form of its hydrochloride salt, cream colored solid. M.P. 116–119° C. after two recrystallizations from ethyl acetate.

By replacing the 2-diethylaminoethyl chloride in the foregoing procedure by a molar equivalent amount of 4-dimethylaminobutyl bromide, 2-methyl-3-dimethylaminopropyl chloride, 2-dihexylaminoethyl chloride, 2-(1-pyrrolidyl)ethyl chloride, 2-(1-piperidyl)ethyl chloride or 2-(4-morpholinyl)ethyl chloride, there can be obtained, respectively, 2-allyl-1-[p-(4-dimethylaminobutoxy)phenyl]-3,4-dihydro-6-methoxynaphthalene [I; R is $CH_2CH=CH_2$, R' is 4-$OCH_2CH_2CH_2CH_2N(CH_3)_2$, R" is 6-$CH_3O$];

2-allyl-1-[p-(2-methyl-3-dimethylaminopropoxy)phenyl]-3,4-dihydro-6-methoxynaphthalene [I; R is $CH_2CH=CH_2$, R' is 4-$OCH_2CH(CH_3)CH_2N(CH_3)_2$, R" is 6-$CH_3O$];

2-allyl-1-[p-(2-dihexylaminoethoxy)phenyl]-3,4-dihydro-6-methoxynaphthalene [I; R is $CH_2CH=CH_2$, R' is 4-$OCH_2CH_2N(C_6H_{13})_2$, R" is 6-$CH_3O$];

2-allyl-1-{p-[2-(1-pyrrolidyl)ethoxy]phenyl}-3,4-dihydro-6-methoxynaphthalene [I; R is $CH_2CH=CH_2$, R' is 4-$OCH_2CH_2N(CH_2)_4$, R" is 6-$CH_3O$];

2-allyl-1-{p-[2-(1-piperidyl)ethoxy]phenyl}-3,4-dihydro-6-methoxynaphthalene [I; R is $CH_2CH=CH_2$, R' is 4-$OCH_2CH_2N(CH_2)_5$, R" is 6-$CH_3O$]; or 2-allyl-1-{p-[2-(4-morpholinyl)ethoxy]phenyl}-3,4-dihydro-6-methoxynaphthalene [I; R is $CH_2CH=CH_2$, R' is 4-$OCH_2CH_2N(CH_2)_4O$, R" is 6-$CH_3O$].

EXAMPLE 3

2-methyl-1-(p-hydroxyphenyl)-3,4-dihydro-6-methoxynaphthalene [I; R is $CH_3$, R' is 4-OH, R" is 6-$CH_3O$] was prepared from 64.3 g. of 4-bromophenyl 2'-tetrahydropyranyl ether, 6.1 g. of magnesium and 38 g. of 2-methyl-3,4-dihydro-6-methoxy-1(2H)-naphthaleneone (Preparation 3) according to the procedure of Example 1. The product was obtained in the form of an oil used directly in the procedure of Example 4 below.

By replacing the 2-methyl-3,4-dihydro-6-methoxy-1(2H)-naphthalenone in the foregoing preparation by a molar equivalent amount of 2-allyl-3,4-dihydro-5-methoxy-1(2H)-naphthalenone,
2-allyl-3,4-dihydro-7-methoxy-1(2H)-naphthalenone,
2-allyl-3,4-dihydro-8-methoxy-1(2H)-naphthalenone,
2-(n-butyl)-3,4-dihydro-6-(2-dimethylaminoethoxy)-1(2H)naphthalenone,
2-(n-butyl)-3,4-dihydro-6-(4-dimethylaminobutoxy)-1(2H)-naphthalenone,
2-(n-butyl)-3,4-dihydro-6-[2-(1-pyrrolidyl)ethoxy]-1(2H)-naphthalenone,
2-(n-butyl)-3,4-dihydro-6-[2(1-piperidyl)ethoxy]-1(2H)-naphthalenone, or
2-(n-butyl)-3,4-dihydro-6-[2-(4-morpholinyl)ethoxy]-1(2H)-naphthalenone, there can be obtained, respectively, 2-allyl-1-(p-hydroxyphenyl)-3,4-dihydro-5-methoxynaphthalene [I; R is $CH_2CH=CH_2$, R' is 4-OH, R" is 5-$CH_3O$];

2-allyl-1-(p-hydroxyphenyl)-3,4-dihydro-7-methoxynaphthalene [I; R is $CH_2CH=CH_2$, R' is 4-OH, R" is 7-$CH_3O$];

2-allyl-1-(p-hydroxyphenyl)-3,4-dihydro-8-methoxynaphthalene [I; R is $CH_2CH=CH_2$, R' is 4-OH, R" is 8-$CH_3O$];

2-(n-butyl)-1-(p-hydroxyphenyl)-3,4-dihydro-6-(2-dimethylaminoethoxy)naphthalene [I; R is $C_4H_9$, R' is 4-OH, R" is 6-$(CH_3)_2NCH_2CH_2O$];

2-(n-butyl)-1-(p-hydroxyphenyl)-3,4-dihydro-6-(4-dimethylaminobutoxy)naphthalene [I; R is $C_4H_9$, R' is 4-OH, R" is 6-$(CH_3)_2NCH_2CH_2CH_2CH_2O$];

2-(n-butyl)-1-(p-hydroxyphenyl)-3,4-dihydro-6-[2-(1-pyrrolidyl)ethoxy]-naphthalene [I; R is $C_4H_9$, R' is 4-OH, R" is 6-$(CH_2)_4NCH_2CH_2O$];

2-(n-butyl)-1-(p-hydroxyphenyl)-3,4-dihydro-6-[2-(1-piperidyl)ethoxy]naphthalene [I; R is $C_4H_9$, R' is 4-OH, R" is 6-$(CH_2)_5NCH_2CH_2O$]; or 2-(n-butyl)-1-(p-hydroxyphenyl)-3,4-dihydro-6-[2-(4-morpholinyl)ethoxy]naphthalene [I; R is $C_4H_9$, R' is 4-OH, R" is 6-$O(CH_2)_4NCH_2CH_2O$].

2-(n-butyl)-1-(p-hydroxyphenyl)-3,4-dihydro-6-(4-dimethylaminobutoxy)naphthalene can be caused to react with 2-diethylaminoethyl chloride in the presence of sodium methoxide according to the procedude of Example 2 to give 2-(n-butyl)-1-[p-(2-diethylaminoethoxy)phenyl]-3,4-dihydro-6-(4-dimethylaminobutoxy)naphthalene [I; R is $C_4H_9$, R' is 4-$(C_2H_5)_2CH_2CH_2O$, R" is

6-$(CH_3)_2NCH_2CH_2CH_2CH_2O$].

EXAMPLE 4

2-allyl-1-(p-acetoxyphenyl)-3,4-dihydro - 6 - methoxynaphthalene [I; R is $CH_2CH=CH_2$, R' is 4-$OCOCH_3$, R" is 6-$CH_3O$].—A mixture of 11.5 g. of 2-methyl-1-(p-hydroxyphenyl)-3,4-dihydro - 6 - methoxynapthalene (Example 3), 40 ml. of acetic anhydride and 3 drops of concentrated sulfuric acid was heated on a steam bath for 75 minutes. The reaction mixture was poured into 600 ml. of ice water, stirred for 30 minutes and then extracted with ether. The ether extracts were washed with saturated sodium chloride solution, dried over anhydrous sodium sulfate, decolorized with activated carbon and concentrated to dryness. The residue was recrystallized from methanol to give 7.5 g. of 2-allyl-1-(p-acetoxyphenyl)-3,4-dihydro-6-methoxynaphthalene, pale cream powder, M.P. 79–81° C.

By replacing the acetic anhydride in the foregoing procedure by a molar equivalent amount of propionic anhydride, caproyl chloride or isovaleryl chloride, there can be obtained, respectively, 2-allyl-1-(p-propionoxyphenyl)-3,4-dihydro-6-methoxynaphthalene [I; R is $CH_2CH=CH_2$, R' is 4-$OCOCH_2CH_3$, R" is 6-$CH_3O$];

2-allyl-1-(p-caproyloxyphenyl)-3,4-dihydro-6-methoxynaphthalene [I; R is $CH_2CH=CH_2$, R' is 4-$OCO(CH_2)_4CH_3$, R" is 6-$CH_3O$]; or 2-allyl-1-(p-isovaleryloxyphenyl)-3,4-dihydro-6-methoxynaphthalene [I; R is $CH_2CH=CH_2$, R' is 4-$OCOCH_2CH(CH_3)_2$, R" is 6-$CH_3O$].

EXAMPLE 5

2-methyl-1-[p-(2-diethylaminoethoxy)phenyl]-3,4-dihydro-6-methoxynaphthalene [I; R is $CH_3$, R' is

4-$OCH_2CH_2N(C_2H_5)_2$,

R" is 6-$CH_3O$] was prepared from 12 g. of 2-methyl-1-(p-hydroxyphenyl)-3,4-dihydro-6-methoxynaphthalene (Example 3), 12.7 g. of 2-diethylaminoethyl chloride and 3.8 g. of sodium methoxide according to the procedure of Example 2. There was obtained 9.2 g. of 2-methyl-1-[p-(2-diethylaminoethoxy)phenyl]-3,4-dihydro-6-methoxynaphthalene in the form of its hydrochloride salt, colorless powder, M.P. 171–173° C. when recrystallized from isopropyl alcohol.

EXAMPLE 6

2-methyl-1-(p-tolyl)-3-4-dihydro - 6 - methoxynaphthalene [I; R is $CH_3$, R' is 4-$CH_3$, R" is 6-$CH_3O$].—A solution of 31 g. of 2-methyl-3,4-dihydro-6-methoxy-1(2H)-naphthalenone (Preparation 3) in 200 ml. of anhydrous benzene was added in a fine stream to refluxing Grignard reagent prepared from 46.3 g. of p-iodotoluene and 6 g. of magnesium in 200 ml. of anhydrous ether. The reaction mixture was refluxed for 20 hours, hydrolyzed with aqueous ammonium chloride and filtered. The ether layer was separated, dried over anhydrous sodium sulfate and concentrated to remove the solvent. The residue was dissolved in 200 ml. of toluene, 500 mg. of p-toluenesulfonic acid added and the solution heated at reflux azeotropically for two hours. Powdered potassium bisulfate (2 g.) was then added and the solution heated at reflux for eight hours and then concentrated to remove the solvent. The residue was retreated with Grignard reagent and the foregoing process repeated. The product was distilled to give 27 g. of 2-methyl-1-(p-tolyl)-3,4-dihydro-6-methoxynaphthalene, B.P. 143–145° C. (0.02 mm.), $n_D^{25}$=1.6085–1.6095.

By replacing the p-iodotoluene in the foregoing preparation by a molar equivalent amount of 1-isobutyl-3-iodobenzene, 1-ethyl-2-iodobenzene, or iodobenzene, there can be obtained, respectively, 2-methyl-1-(m-isobutylphenyl)-3,4-dihydro-6-methoxynaphthalene[I; R is $CH_3$, R' is 3-($CH_2CH(CH_3)_2$, R" is 6-$CH_3O$];
2-methyl-1-(o-ethylphenyl)-3,4-dihydro-6-methoxynaphthalene [I; R is $CH_3$, R' is 2-$CH_2CH_3$, R" is 6-$CH_3O$];
or 2-methyl-1-phenyl-3,4-dihydro-6-methoxynaphthalene [I; R is $CH_3$, R' is H, R" is 6-$CH_3O$].

EXAMPLE 7

2-methyl-1-(p-tolyl) - 3,4 - dihydro-6-hydroxynaphthalene [I; R is $CH_3$, R' is 4-$CH_3$, R"$_2$ is 6-HO].—A mixture of 16.5 g. of 2-methyl-1-(p-tolyl)-3,4-dihydro-6-methoxynaphthalene (Example 6) and 75 g. of pyridine hydrochloride was stirred at reflux under nitrogen for three hours. The reaction mixture was cooled, partitioned between ether and water, and the neutral and phenolic material separated by extracting the ether layer with aqueous potassium hydroxide. The alkaline extracts were acidified and the resulting 2-methyl-1-(p-tolyl)-3,4-dihydro-6-hydroxynaphthalene isolated in the form of an oil which was used directly to prepare derivatives as described hereinbelow.

EXAMPLE 8

2-methyl-1-(p-tolyl)-3,4-dihydro - 6 - acetoxynaphthalene [I; R is $CH_3$, R'$_2$ is 4-$CH_3$, R" is 6-$CH_3COO$] was prepared from 10 g. of 2-methyl-1-(p-tolyl)-3,4-dihydro-6-hydroxynaphthalene (Example 7), 40 ml. of acetic anhydride and 3 drops of concentrated sulfuric acid. The mixture was stirred at room temperature for sixteen hours and worked up according to the procedure of Example 4 to give 6.5 g. of 2-methyl-1-(p-tolyl)-3,4-dihydro-6-acetoxynaphthalene, pale cream solid, M.P. 130–132° C. when recrystallized from ether and from methanolacetone.

By replacing the acetic anhydride in the foregoing preparation by a molar equivalent amount of propionic anhydride, isobutyric anhydride or caproyl chloride, there can be obtained, respectively, 2-methyl-1-(p-tolyl)-3,4-dihydro-6-propionoxynaphthalene [I; R is $CH_3$, R' is 4-$CH_3$, R" is 6-$CH_2CH_2COO$];
2-methyl-1-(p-tolyl)-3,4-dihydro-6-isobutyroxynaphthalene [I; R is $CH_3$, R' is 4-$CH_3$, R" is 6-($CH_3)_2CHOO$]; or
2-methyl-1-(p-tolyl)-3,4-dihydro-6-caproyloxynaphthalene [I; R is $CH_3$, R' is 4-$CH_3$, R" is 6-$CH_3(CH_2)_4COO$].

EXAMPLE 9

2-methyl-1-(p-tolyl) - 3,4 - dihydro-6-(2-diethylaminoethoxy)-naphthalene [I; R is $CH_3$, R' is 4-$CH_3$, R" is 6-($C_2H_5)_2CH_2CH_2O$] was prepared from 15.6 g. of 2-methyl-1-(p-tolyl)-3,4-dihydro - 6 - hydroxynaphthalene (Example 7), 18.4 g. of 2-diethylaminoethyl chloride and 5.1 g. of sodium methoxide according to the procedure of Example 2, and was obtained (11 g.) in the form of its hydrochloride salt, pale cream powder, M.P. 148–150° C. when recrystallized from acetone.

EXAMPLE 10

(a) 2 - methyl-1-(p-methoxyphenyl)-3,4-dihydro-6-methoxynaphthalene [I; R is $CH_3$, R' is 4-$OCH_3$, R" is 6-$CH_3O$] was prepared from 38 g. of 2-methyl-3,4-dihydro-6-methoxy-1(2H)-naphthalenone (Preparation 3) and the Grignard reagent from 41 g. of p-bromoanisole according to the procedure of Example 6, and was obtained (28.5 g.) in the form of pale gray platelets, M.P. 97.5–100° C. when recrystallized from isopropyl alcohol.

(b) 2-methyl-1-(p-acetoxyphenyl) - 3,4 - dihydro-6-acetoxynaphthalene [I; R is $CH_3$, R' is 4-$OCOCH_3$, R" is 6-$CH_3COO$] was prepared from 2-methyl-1-(p-methoxyphenyl)-3,4-dihydro-6-methoxynaphthalene by refluxing with pyridine hydrochloride and acetylation of the resulting dihydroxy compound [I; R is $CH_3$, R' is 4-OH, R" is 6-HO with acetic anhydride according to the procedure of Examples 7 and 8, and was obtained (8 g.) in the form of colorless needles, M.P. 120–121° C. when recrystallized from methanol and from ether.

EXAMPLE 11

(a) 2-butyl-1-(p-methoxyphenyl)-3,4-dihydro - 6 - methoxynaphthalene [I; R is $CH_2CH_2CH_2CH_3$, R' is 4-$OCH_3$, R" is 6-$CH_3O$] was prepared from 86 g. of butyl-3,4 - dihydro-6-methoxy-1(2H)-naphthalenone (Preparation 2) and the Grignard reagent from 93 g. of p-bromoanisole according to the procedure of Example 6, and was obtained (89 g.) in the form of a pale yellow oil; B.P. 163–181° C. (0.07 mm.).

(b) 2-butyl-1-(p-acetoxyphenyl) - 3,4 - dihydro-6-acetoxynaphthalene [I; R is $CH_2CH_2CH_2CH_3$, R' is 4-$OCOCH_3$, R" is 6-$CH_3COO$] was prepared from 2-2-butyl - 1 - (p - methoxyphenyl)-3,4-dihydro-6-methoxynaphthalene by refluxing with pyridine hydrochloride and acetylation of the resulting dihydroxy compound [I; R is $CH_2CH_2CH_2CH_3$, R' is 4-OH, R" is 6-HO] with acetic anhydride according to the procedures of Examples 7 and 8, and was obtained (5.7 g.) in the form of a yellow oil when purified by thick layer chromatography on silica plates.

EXAMPLE 12

2-butyl-1-(p-hydroxphenyl)-3,4-dihydro - 6 - methoxynaphthalene [I; R is $CH_2CH_2CH_2CH_3$, R' is 4-OH, R" is 6-$CH_3O$] was prepared from 81 g. of 2-butyl-3,4-dihydro-6-methoxy-1(2H)-naphthalenone (Preparation 2) and the Grignard reagent from 113 g. of p-bromophenyl 2-tetrahydropyranyl ether according to the procedure of Example 1, and was obtained in the form of an oil used directly to prepare derivatives as described hereinbelow.

EXAMPLE 13

2-butyl-1-(p-acetoxyphenyl) - 3,4 - dihydro-6-methoxy- naphthalene [I; R is $CH_2CH_2CH_2CH_3$, R' is 4-$OCOCH_3$, R" is 6-$CH_3O$] was prepared by acetylation of 2-butyl-1-(p-hydroxyphenyl)-3,4-dihydro - 6 - methoxy-naphthalene according to the procedure of Example 4, and was obtained in the form of a straw-colored oil when purified by thick layer chromatography.

EXAMPLE 14

2 - butyl-1-[p-(2-diethylaminoethoxy)phenyl]-3,4-dihydro-6-methoxynaphthalene [I; R is $CH_2CH_2CH_2CH_3$, R' is 4-$OCH_2CH_2N$-$(C_2H_5)_2$, R" is 6-$CH_3O$] was prepared from 20 g. of 2-butyl-1-(p-hydroxyphenyl)-3,4-dihydro-6-methoxynaphthalene (Example 12) and 18.4 g. of 2-diethylaminoethyl chloride according to the procedure of Example 2, and was obtained (22 g.) in the form of its hydrochloride salt, tan powder, M.P. 120–122° C. when recrystallized from ethyl acetate.

EXAMPLE 15

2 - butyl - 1-[p-(2,3-dihydroxypropoxy)phenyl]-3,4-dihydro-6-methoxynaphthalene [I; R is $CH_2CH_2CH_2CH_3$, R' is 4-$OCH_2CH(OH)CH_2OH$, R" is 6-$CH_3O$].—A mixture of 9.0 g. of 2-butyl-1-(p-hydroxyphenyl)-3,4-dihydro-6-methoxynaphthalene (Example 12), 1.8 g. of sodium methoxide and 100 ml. of isoamyl alcohol was stirred and distilled until the head temperature reached 130° C. The mixture was cooled, 3.3 g. of 3-chloro-1,3-propanediol and 100 mg. of sodium iodide were added, and the reaction mixture stirred under reflux for 150 minutes. The reaction mixture was concentrated to remove solvent and the residue partitioned between water and ether. The ether layer was dried over anhydrous sodium sulfate and concentrated. The residue was dissolved in chloroform and chromatographed on thick layer silica plates developed with 10% acetic acid in benzene. The band containing the desired product was scraped off, extracted with ether, washed with sodium bicarbonate solution, dried and concentrated *in vacuo* to produce 2-butyl-1-[p-(2,3-dihydroxypropoxy)phenyl] - 3,4-dihydro-6-methoxynaphthalene in the form of a reddish brown oil.

By replacing the 3-chloro-1,2-propanediol in the foregoing preparation by a molar equivalent amount of ethylene chlorohydrin or 6-chlorohexanol, there can be obtained, respectively, 2 - butyl - 1-[p-(2-hydroxyethoxy)phenyl] - 3,4 - dihydro-6-methoxynaphthalene [I; R is $CH_2CH_2CH_2CH_3$, R' is 4-$OCH_2CH_2OH$, R" is 6-$CH_3O$], or 2-butyl-1-[p-(6-hydroxyhexyloxy)phenyl]-3,4-dihydro-6-methoxynaphthalene [I; R is $CH_2CH_2CH_2CH_3$, R' is 4-$O(CH_2)_6OH$, R" is 6-$CH_3O$].

EXAMPLE 16

(a) 2 - decyl - 1 - (p-methoxyphenyl)-3,4-dihydro-6-methoxynaphthalene [I; R is $(CH_2)_9CH_3$, R' is 4-$OCH_3$, R" is 6-$CH_3O$] was prepared from 120 g. of 2-(n-decyl)-3,4 - dihydro-6-methoxy-1(2H)-naphthalenone (Preparation 5) and the Grignard reagent from 93.5 g. of p-bromoanisole according to the procedure of Example 6, followed by dehydration of the intermediate carbinol by azeotropic reflux with 0.5 g. of p-toluenesulfonic acid in 300 ml. of toluene. The crude product was chromatographed on silica and eluted with benzene-hexane (1:1) to give 2-decyl-1-(p-methoxyphenyl)-3,4-dihydro-6-methoxynaphthalene as a pale yellow oil.

(b) 2 - decyl - 1-(p-acetoxyphenyl)-3,4-dihydro-6-acetoxynaphthalate [I; R is $(CH_2)_9CH_3$, R is 4-$OCOCH_3$ R" is 6-$CH_3COO$].—A solution of 25 g. of boron tribromide in 100 ml. of methylene dichloride was added dropwise to a stirred suspension of 26 g. of 2-decyl-1-(p-methoxyphenyl)-3,4-dihydro-6-methoxynaphthalene (Example 16) in 400 ml. of methylene dichloride held at ethanol-Dry Ice temperature under nitrogen. The mixture was stirred for 30 minutes, allowed to warm to room temperature and stirred 16 hours longer. An additional 12.5 g. of boron tribromide in 50 ml. of methylene dichloride was added dropwise and the reaction mixture stirred overnight. The reaction mixture was added to water, the layers separated and the aqueous layer extracted with chloroform. The combined organic layers were dried over anhydrous sodium sulfate, concentrated, and the residue containing the dihydroxy compound [I; R is $(CH_2)_9CH_3$, R' is 4-OH, R" is 6-HO] treated with 150 ml. of acetic anhydride and 5 drops of sulfuric acid, which mixture was stirred 45 minutes at 0° C. and 45 minutes at room temperature. The product was chromatographed repeatedly on thick layer plates, developed with 20% acetic acid in benzene and eluted with ether, to give 2-decyl-1-(p-acetoxyphenyl)-3,4-dihydro-6-acetoxynaphthalene (6 g.) in the form of a straw-colored oil.

EXAMPLE 17

2 - decyl-1-(p-hydroxyphenyl-3,4-dihydro-6-methoxynaphthalene [I; R is $(CH_2)_9CH_3$, R' is 4-OH, R" is 6-$CH_3O$] was prepared from 120 g. of 2-(n-decyl)-3,4-dihydro - 6-methoxy-1(2H)-naphthalenone (Preparation 5) and the Grignard reagent from 128.6 g. of 4-bromophenyl 2'-tetrahydropyranyl ether according to the procedure of Example 1, and was obtained in the form of a straw-colored oil (79 g.) used directly to prepare derivatives as described hereinbelow.

EXAMPLE 18

2 - decyl - 1-(p-acetoxyphenyl)-3,4-dihydro-6-methoxynaphthalene [I; R is $(CH_2)_9CH_3$, R' is 4-$OCOCH_3$, R" is 6-$CH_3O$] was prepared by acetylation of 2-decyl-1-(p-hydroxyphenyl) - 3,4-dihydro-6-methoxynaphthalene (Example 17) according to the procedure of Example 4, and was obtained in the form of a pale yellow oil when purified by chromatography on silica.

EXAMPLE 19

2 - decyl-1-{p-[2-(1-pyrrolidyl)ethoxy]phenyl}-3,4-dihydro-6-methoxynaphthalene [I; R is $(CH_2)_9CH_3$, R' is 4-$OCH_2CH_2N(CH_2)_4$, R" is 6-$CH_3O$] was prepared from 19.6 g. of 2 - decyl-1-(p-hydroxyphenyl)-3,4-dihydro-6-methoxynaphthalene (Example 17) and 13.4 g. of 2-(1-pyrrolidyl)ethyl chloride according to the procedure of Example 2, and was obtained in the form of its hydrochloride salt, pale cream waxy platelets, M.P. 123–124° C. when recrystallized from ethyl acetate.

EXAMPLE 20

(a) 2 - hexyl - 1 - (p-methoxyphenyl)-3,4-dihydro-6-methoxynaphthalene [I; R is $(CH_2)_5CH_3$, R' is 4-$OCH_3$, R" is 6-$CH_3O$] was prepared from 76 g. of 2-(n-hexyl)-3,4 - dihydro-6-methoxy-1(2H)-naphthalenone (Preparation 4) and the Grignard reagent from 75 g. of p-bromoanisole according to the procedure of Example 6 and was obtained (28 g.) as a pale yellow oil after chromatography on silica and elution was benzene-hexane (1:1).

(b) 2 - hexyl - 1-(p-acetoxyphenyl)-3,4-dihydro-6-acetoxynaphthalene [I; R is $(CH_2)_5CH_3$, R' is 4-$OCOCH_3$, R" is 6-$CH_3COO$] was prepared from 26 g. of 2-hexyl-1-(p-methoxyphenyl) - 3,4 - dihydro-6-methoxynaphthalene (part a) by demethylation with 25 g. of borontribromide and acetylation with acetic anhydride according to the procedure of Example 16(b). The product was chromatographed repeatedly on thick plates, developed with 20% acetic acid in benzene and eluted with ether to give 2-hexyl - 1 - (p-acetoxyphenyl)-3,4-dihydro-6-acetoxynaphthalene in the form of a straw-colored oil.

EXAMPLE 21

2 - hexvl-1-(p-hydroxyphenyl)-3,4-dihydro-6-methoxynaphthalene [I; R is $(CH_2)_5CH_3$, R' is 4-OH, R" is 6-$CH_3O$] was prepared from 76 g. of 2-(n-hexyl)-3,4-dihydro - 6-methoxy-1(2H)-naphthalene (Preparation 4) and the Grignard reagent from 103 g. of 4-bromophenyl 2'-tetrahydropyranyl ether according to the procedure of Example 1. The product was chromatographed on silica and eluted with chloroform to give 2-hexyl-1-(p-hydroxyphenyl)-3,4-dihydro-6-methoxynaphthalene in the form of an oil which was used directly to prepare derivatives as described hereinbelow.

EXAMPLE 22

2-hexyl-1-(p-acetoxyphenyl) - 3,4 - dihydro-6-methoxynaphthalene [I; R is $(CH_2)_5CH_3$, R' is 4-$OCOCH_3$, R" is 6-CH₃O] was prepared by acetylation of 27.5 g. of 2-hexyl-1-(p-hydroxyphenyl)-3,4-dihydro-6-methoxynaphthalene (Example 21), and was obtained in the form of a pale yellow oil (26 g.) when purified by chromatography on silica.

EXAMPLE 23

2-hexyl - 1 - {p-[2-(1-pyrrolidyl)ethoxy]phenyl}-3,4-dihydro-6-methoxynaphthalene [I; R is (CH₂)₅CH₃, R' is 4-OCH₂CH₂N(CH₂)₄, R" is 6-CH₃O] was prepared from 20 g. of 2-hexyl-1-(p-hydroxyphenyl)-3,4-dihydro-6-methoxynaphthalene (Example 21) and 16 g. of 2-(1-pyrrolidyl)ethyl chloride according to the procedure of Example 2, and was obtained in the form of its hydrochloride salt, cream platelets, M.P. 143–145° C. (17 g.) when recrystallized from ethyl acetate.

I claim:

1. A compound of the formula

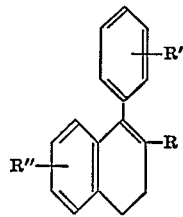

wherein R is alkyl or alkenyl of from one to ten carbon atoms; R' is a member of the group consisting of hydrogen, lower-alkyl, hydroxy, lower-alkanoyloxy, hydroxy-lower-alkoxy, and dihydroxy-lower-alkoxy; and R" is a member of the group consisting of hydroxy, lower-alkoxy, lower-alkanoyloxy, hydroxy-lower-alkoxy, and dihydroxy-lower-alkoxy.

2. A compound according to claim 1 wherein the group R' is in the para-position of the phenyl ring, and the group R" is in the 6-position of the naphthalene nucleus.

3. 2-alkenyl-1-(p-hydroxyphenyl) - 3,4 - dihydro-6-lower-alkoxynaphthalene, according to claim 2.

4. 2-allyl-1-(p-hydroxyphenyl) - 3,4 - dihydro-6-methoxynaphthalene, according to claim 3.

5. 2-alkyl-1-(p-hydroxyphenyl) - 3,4 - dihydro-6-lower-alkoxynaphthalene, according to claim 2.

6. 2-alkyl-1-(p-hydroxyphenyl) - 3,4 - dihydro-6-hydroxynaphthalene, according to claim 2.

7. 2-allyl-1-(p-acetoxyphenyl) - 3,4 - dihydro-6-methoxynaphthalene, according to claim 2.

8. 2-methyl-1-(p-tolyl) - 3,4 - dihydro-6-acetoxynaphthalene, according to claim 2.

9. 2-methyl - 1 - (p - acetoxyphenyl)3,4-dihydro-6-acetoxynaphthalene, according to claim 2.

10. 2 - butyl-1-(p-acetoxyphenyl) - 3,4 - dihydro-6-acetoxynaphthalene, according to claim 2.

11. 2-butyl-1-(p-acetoxyphenyl) - 3,4 - dihydro-6-methoxynaphthalene, according to claim 2.

12. 2-butyl - 1 - [p-(2,3-dihydroxypropoxy)phenyl]-3,4-dihydro-6-methoxynaphthalene, according to claim 2.

13. 2-decyl-1-(p - acetoxyphenyl) - 3,4 - dihydro-6-acetoxynaphthalene, according to claim 2.

14. 2-decyl-1-(p-acetoxyphenyl) - 3,4 - dihydro-6-methoxynaphthalene, according to claim 2.

15. 2-hexyl-1-(p-acetoxyphenyl) - 3,4 - dihydro-6-methoxynaphthalene, according to claim 2.

16. 2-hexyl-1-(p-acetoxyphenyl) - 3,4 - dihydro-6-methoxynaphthalene, according to claim 2.

References Cited

UNITED STATES PATENTS 3,567,737 3/1971 Lednicer _____ 260—612
3,471,565 10/1969 Nagata et al. _____ 260—590

OTHER REFERENCES

Fieser et al., Organic Chem. (1958), pp. 46 and 47.
Bergmann et al., Chem. Abstracts, vol. 41 (1947), pp. 6230–1.
Muller et al., Chem. Abstracts, vol. 46 (1952), pp. 3522–3.

JAMES A. PATTEN, Primary Examiner

U.S. Cl. X.R.

260—247.2 B, 247.5, 247.7 A, 247.7 C, 293.78, 293.88, 293.9, 326.3, 326.5 R, 326.5 L, 326.5 M, 345.8, 345.9, 501.1, 501.21, 566 AE, 570.7, 590, 612 R, 613 R, 619 F; 424—248, 267, 274, 311, 330